United States Patent
Hars

(10) Patent No.: US 6,925,342 B2
(45) Date of Patent: Aug. 2, 2005

(54) SYSTEM AND METHOD FOR PROTECTING DIGITAL MEDIA

(75) Inventor: Laszlo Hars, Cortlandt Manor, NY (US)

(73) Assignee: Koninklijke Philips Electronics N.V., Eindhoven (NL)

(*) Notice: Subject to any disclaimer, the term of this patent is extended or adjusted under 35 U.S.C. 154(b) by 880 days.

(21) Appl. No.: 09/730,336

(22) Filed: Dec. 5, 2000

(65) Prior Publication Data

US 2002/0068987 A1 Jun. 6, 2002

(51) Int. Cl.[7] .................... G06F 17/00; H04N 7/167
(52) U.S. Cl. .................. 700/94; 380/201; 380/203; 380/206; 380/207; 380/209
(58) Field of Search ............... 700/94; 380/201, 380/202, 203, 205, 206, 207, 208, 209, 176, 177, 178, 179; 382/100, 232

(56) References Cited

U.S. PATENT DOCUMENTS

| | | | |
|---|---|---|---|
| 5,513,260 A | | 4/1996 | Ryan |
| 5,949,885 A | * | 9/1999 | Leighton .................. 380/54 |
| 6,611,607 B1 | * | 8/2003 | Davis et al. ............... 382/100 |
| 6,671,387 B1 | * | 12/2003 | Chen et al. ............... 382/100 |
| 6,674,874 B1 | * | 1/2004 | Yoshida et al. ........... 382/100 |
| 2002/0073317 A1 | * | 6/2002 | Hars ...................... 713/176 |

FOREIGN PATENT DOCUMENTS

| | | |
|---|---|---|
| EP | 908881 | 4/1999 |
| WO | WO9960568 | 11/1999 |

* cited by examiner

*Primary Examiner*—Sinh Tran
*Assistant Examiner*—Devona E. Faulk
(74) *Attorney, Agent, or Firm*—Gregory L. Thorne

(57) ABSTRACT

A system and method for verifying digital recordings that have a plurality of tracks. The system includes an encoder that: divides the digital recording into a plurality of sections and associates a random number with each section; calculates an identifier as a function of the associated random numbers; and watermarks sections within a block of sections with the associated random number and a portion of the identifier. A verification system is provided that extracts the random numbers and identifier portions; calculates a first identifier as a function of the extracted random numbers; calculates a second identifier based on the identifier portions; and compares the first identifier and the second identifier.

13 Claims, 2 Drawing Sheets

SYSTEM AND METHOD FOR PROTECTING DIGITAL MEDIA

BACKGROUND OF THE INVENTION

1. Technical Field

The present invention relates generally to security systems for digital recordings, and more particularly relates to anti-pirating schemes for controlling the copying, playing, and distribution of digital music.

2. Related Art

The popularity of both the Internet and digital media technologies (e.g., compact disks "CD's" and digital versatile disks "DVD's") has created tremendous problems for copyright owners of digital media content. The ability to reproduce, play and transmit digital content has become readily available to anyone with a personal computer and access to the Internet. This ability has led to widespread abuses to the rights of copyright owners who are unable to stop the illegal reproduction of their works.

One particular area where copyright ownership is particularly abused involves the music industry. The illicit pirating of digital music across the Internet is causing immeasurable damages to the music industry. Heretofore, most music content has been packaged and stored in an open, unsecured format that can be read and processed by any digital media player or recorder, i.e., content can be readily reproduced, stored and transmitted. To address this, the music industry has sought to create a secure domain to control the rampant pirating of music.

One solution the music industry is exploring involves establishing standards for secure playback and recording devices that process specially encoded content. Numerous secure devices and systems have been proposed. For instance, U.S. Pat. No. 5,513,260, issued on Apr. 30, 1996, entitled, Method and Apparatus For Copy Protection For Various Recording Media, describes a system in which an authorization signature is required before a protected CD can be played. PCT application WO 99/60568, published on Nov. 25, 1999, entitled, Copy Protection Using Broken Modulation Rules, also discloses various anti-pirating systems. Each of these references is hereby incorporated by reference.

In addition, a group referred to as SDMI (Secure Digital Music Initiative), made up of more than 180 companies and organizations representing information technology, consumer electronics, telecommunication, security technology, the worldwide recording industry, and Internet service providers, is attempting to develop standards and architectures for secure delivery of digital music in all forms. Information regarding SDMI can be found at their website at <www.sdmi.org>.

One of the challenges with implementing compliant systems, such as those sought under SDMI, is that various competing requirements must be met. For instance, under SDMI: (1) people must be allowed to make an unlimited number of personal copies of their CDs if in possession of the original CD; (2) SDMI-compliant players must be able to play music already in a library; (3) SDMI must provide the ability to prevent large numbers of perfect digital copies of music; and (4) SDMI must prevent the distribution on the Internet without any compensation to the creator or copyright holder. Thus, SDMI requires that a limited form of copying must be allowed, while at the same time widespread copying must be prohibited.

Unfortunately, such competing requirements create opportunities for hackers and pirates to defeat the protection schemes of the systems. Accordingly, protection schemes that are difficult to defeat, but will meet the open requirements for initiatives such as SDMI, must be developed.

SUMMARY OF THE INVENTION

This invention addresses the above-mentioned problems, as well as others, by providing a protection system and method that verifies ownership of a digital recording by requiring the presence of the entire medium (e.g., CD), or entire collection of tracks, as they existed when the digital recording was originally distributed.

In a first aspect, the invention provides a system for marking a digital recording, wherein the digital recording includes a plurality of tracks, comprising: a mechanism for dividing the digital recording into a plurality of sections and associating a random number to each section; a mechanism for calculating an identifier as a function of the associated random numbers; and a watermarking mechanism for watermarking sections within a block of sections, wherein the watermark for each section includes the random number associated with the section and a portion of the identifier.

In a second aspect, the invention provides a system for verifying a digital recording by ensuring a completeness of the digital recording, comprising: a mechanism for reading watermarks from each of a plurality of sections on the digital recording and extracting a first and second part from each watermark; a mechanism for calculating a first identifier as a function of the extracted first parts; a mechanism for calculating a second identifier based on a block of the second extracted parts; and a mechanism for comparing the first identifier and the second identifier.

In a third aspect, the invention provides a program product stored on a recordable media for marking a digital recording having a plurality of tracks that, when executed, comprises: means for assigning a value to each of a plurality of sections within the digital recording; means for calculating an identifier as a function of all of the assigned values; and means for determining a watermark for each section within a block of sections, wherein each watermark includes the value assigned to the section and a portion of the identifier.

In a fourth aspect, the invention provides a program product stored on a recordable media for verifying a digital recording that, when executed, comprises: means for reading watermarks from each of a plurality of sections on the digital recording and extracting a first part and a second part from each watermark; means for calculating a first identifier as a function of the extracted first parts; means for calculating a second identifier based on a block of the second extracted parts; and means for comparing the first identifier and the second identifier.

In a fifth aspect, the invention provides a method for preventing unauthorized use of a digital recording, wherein the digital recording includes a plurality of tracks, comprising the steps of: encoding the digital recording by partitioning the digital recording into a plurality of sections; generating a random number for each section; calculating an identifier as a function of all of the generated random numbers; splitting the identifier into m partitions, wherein m is an integer; grouping the sections into blocks of m sections; and watermarking each section in each block with the random number for the section and one of the m partitions.

In a sixth aspect, the invention includes a watermarked digital recording, comprising: a plurality of tracks; and a plurality of sections commingled with the plurality of tracks, wherein each section includes a random value and a value that is dependent on the random values for all of the sections.

BRIEF DESCRIPTION OF THE DRAWINGS

The preferred exemplary embodiment of the present invention will hereinafter be described in conjunction with the appended drawings, where like designations denote like elements, and.

DETAILED DESCRIPTION OF THE DRAWINGS

1. Overview

The present invention provides a system and method for protecting digital recordings from illicit processing. The term "processing," as used herein, may include any type of reproduction, transmission, playback, modification, etc., of the digital content. The term "digital content" may include any type of information, data, music, video, multimedia, etc. that can be stored in a digital format. The described embodiments accomplish protection by requiring a complete data set of the digital recording to be present before processing can occur. For example, in the music industry, music is typically delivered on an audio CD that comprises a collection of tracks or songs. This invention would thus provide a system and method requiring the complete collection of tracks to be present before processing. Since illicit music copying is often limited to a small subset of the songs on a CD, the ability to illegally post and download individual songs from the Internet would be substantially limited.

Accordingly, the exemplary embodiments described herein require the presence of the whole medium (or entire collection of data as originally distributed) at the time of processing as proof of legal ownership. If a portion of the medium is not present, the processing of the digital recording can be aborted.

Although one important application of this invention relates to the delivery of music content, it should be understood that the invention has applications to any type of digital recording that has a plurality of tracks. For the purposes of this disclosure, "a plurality of tracks" shall be defined to include any digital recording that has more than one individually usable or desirable segment.

2. Exemplary Embodiment

Figure 1:
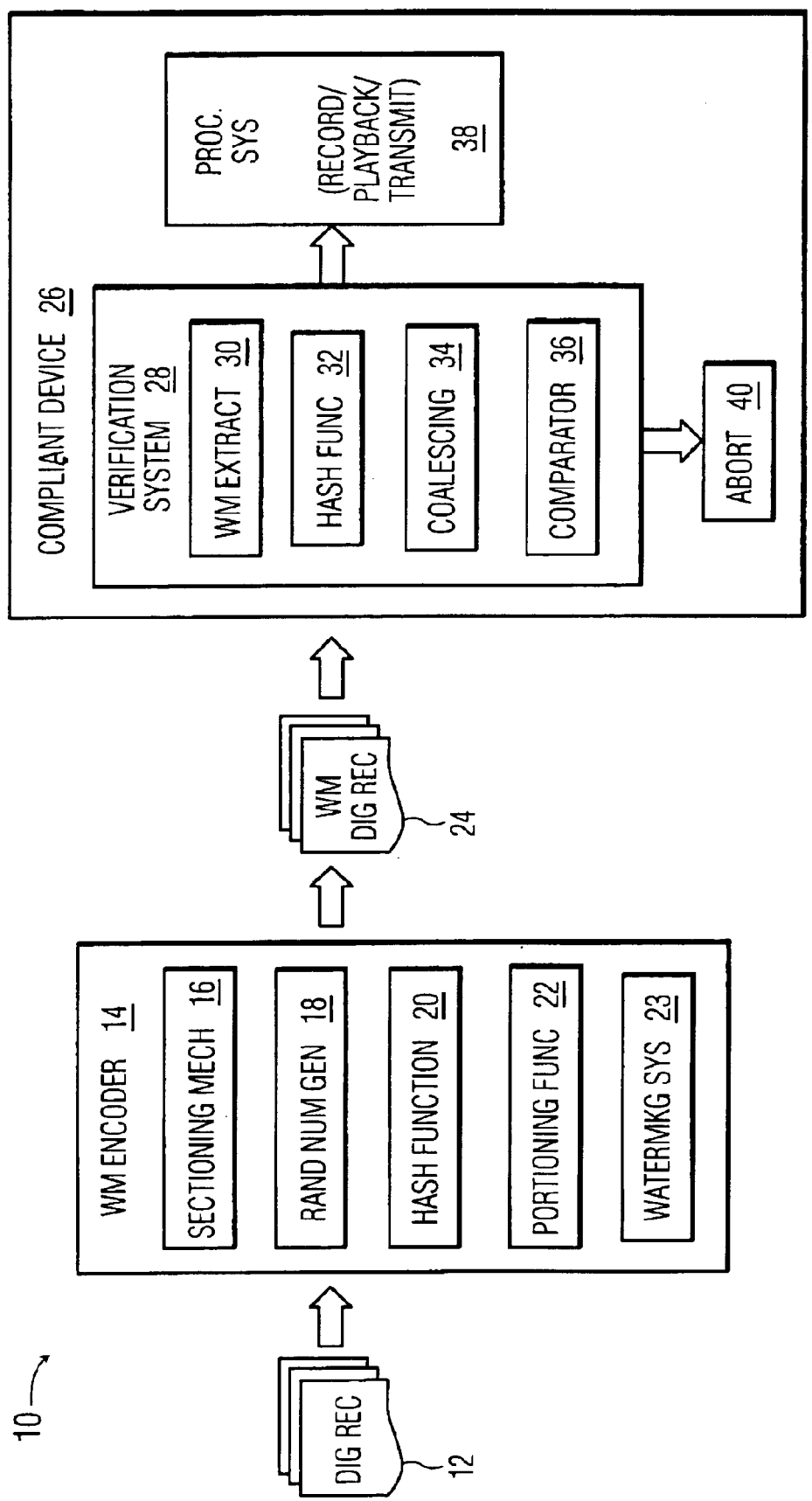
FIG. 1 depicts a block diagram of a verification system in accordance with a preferred embodiment of the invention.

Referring now to the figures, FIG. 1 depicts an anti-pirating system 10 for encoding and verifying a digital recording 12 having a plurality of tracks, such as a music CD. Encoding is accomplished with a watermark encoder 14, and verification is accomplished with a verification system 28. In this embodiment, verification system 28 is shown as part of a compliant device 26 (e.g., a CD recorder or player), but could exist independently from other components.

Watermark encoder 14 receives digital recording 12 and generates a watermarked digital recording 24. Watermark encoder 14 comprises various modules for encoding digital recording 12. These modules include a sectioning mechanism 16, a random number generator 18, a hash function 20, a portioning function 22, and a watermarking system 23. The process of how these modules encode digital recording 12 is described in detail with regard to FIG. 2. Once encoded, a watermarked digital recording 24 is provided, which can be distributed or sold to the general public in a format that will allow compliant systems, such as compliant device 26, to limit illicit processing.

A compliant device 26, as shown in FIG. 1, may include any type of system for processing watermarked digital recording 24, e.g., a recording device for making copies of a watermarked CD. While there are no specific limitations placed on compliant device 26, it is understood that it generally comprises a system compliant with watermark encoder 14, i.e., it can analyze a watermark created by watermark encoder 14. Compliant device 26 includes a verification system 28 for verifying watermarked digital recording 24, a processing system 38 for performing the actual processing operation of the digital recording (e.g., record/playback/transmit), and an abort system 40 for aborting processing when the inputted digital recording is not properly verified.

Verification system 28 comprises various modules for verifying the watermark in watermarked digital recording 24. These modules may include a watermark extractor 30, a hash function 32, a coalescing function 34, and comparator 36. The operation of these modules is described in more detail below with reference to FIG. 2.

Figure 2:
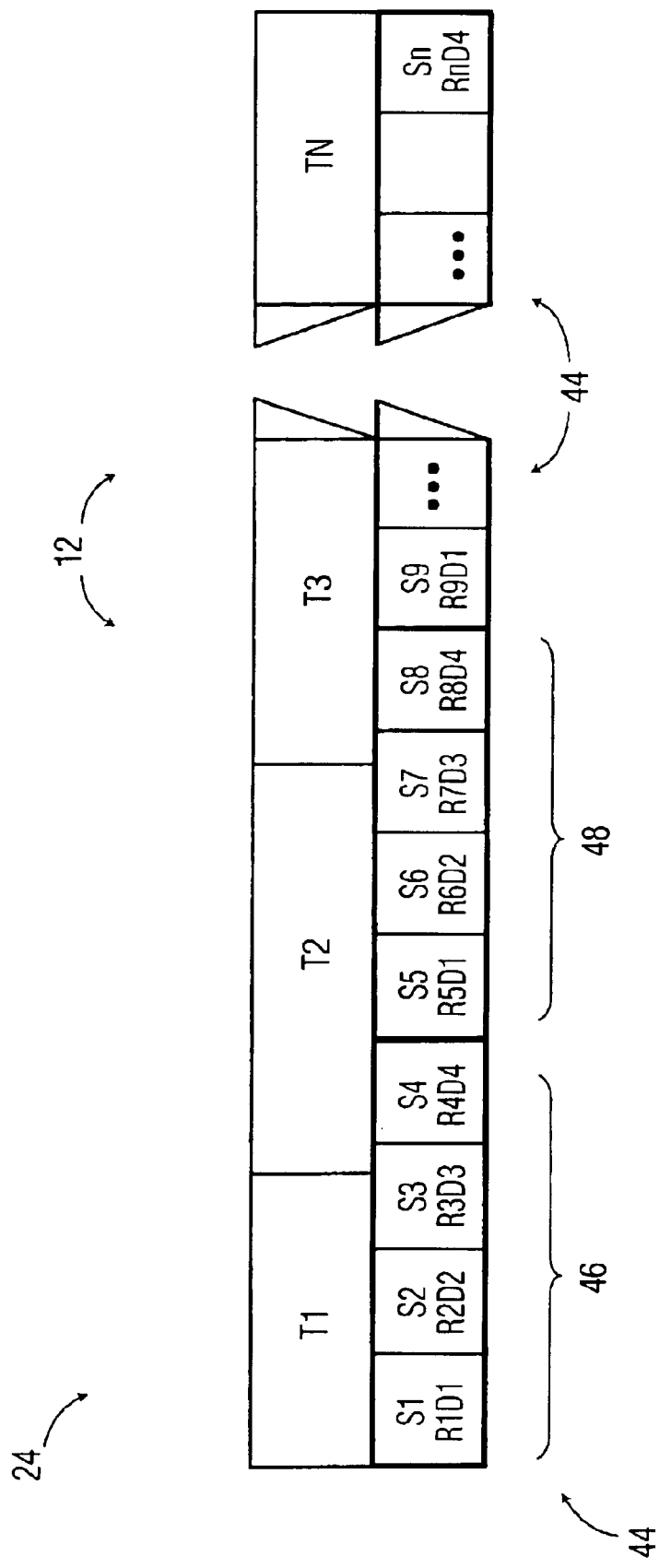
FIG. 2 depicts a graphical representation of a digital recording containing watermarked information in accordance with the invention.

FIG. 2 depicts a watermarked digital recording 24 comprised of: (1) a digital recording 12 having a plurality of tracks (T1, T2, T3 ... TN), and (2) a plurality of sections 44 (S1, S2, S3 ... Sn) that contain watermark information. The watermark information is commingled with the tracks such that each track has several sections of watermark information associated therewith. The placement of the watermark information along side the tracks may be accomplished in any manner known in the art.

As noted, digital recording 12 comprises digital content, such as a music CD containing N songs. Watermark information is stored in each of the n sections 44. Each section 44 includes an individual watermark element (R1D1, R2D2, R3D3 ... ) that is required to be present to verify any portion of digital recording 24. Thus, if a section is missing, digital recording 24 will not be verified. Accordingly, a single track (e.g., T1) cannot be processed unless all of the other tracks are present. The sections are logically grouped into blocks of sections 46 and 48, with each block containing m sections where m is any integer.

The procedure for creating watermarked digital recording 24 from digital recording 12 is as follows. First, sectioning mechanism 16 of watermark encoder 14 partitions digital recording 12 into a plurality of logical sections 44 (S1, S2 ... Sn), each of a predetermined length. For example, for a music CD, each section 44 may be approximately 15 seconds in length. Next, random number generator 18 generates an r-bit random number Ri for each section i. Each r-bit random number (R1, R2 ... Rn) may be any size, but preferably comprises 4 to 16 bits. Next, a d-bit hash of these random numbers is generated by hash function 20. The resulting d-bit value, referred to herein as identifier D is given by $D=H(R1, R2, R3 ...)$, where H is hash function 20. Hash functions are well known in the art, and hash function 20 may comprise any function that can operate on the random numbers and generate a single value D, e.g., a sum value. The d-bit hash may be of any size, but preferably comprises 32 to 80 bits of data.

The next step is to split identifier D into m portions, and to map each of the m portions into each block of sections 46, 48. The splitting process is accomplished with portioning function "P" 22, where $P(D)=D1, D2 ... Dm$. In the embodiment depicted in FIG. 2, m=4, denoting that each block comprises four sections and identifier D is split into four portions. The d-bit identifier D may be split and mapped in any manner. For example, groups of bits ranging from least significant to most significant may be split into portions D1, D2, D3 . . . Dm. It is understood that the number of sections "m" in a block can be any integer, but preferably is between 1 and 16. In the case where m=1, each section is its own block.

Once all the random numbers (R1, R2 . . . Rn) and identifier portions (D1, D2 . . . Dm) are calculated, each section is watermarked by watermark system 23 with: (1) the section's associated random number Ri, and (2) one of m identifier portions (D1, D2 . . . Dm). In this exemplary embodiment, each section i is given a watermark $WM_i$, where $WM_i$=Ri D(1+(i mod m)). Thus, referring to FIG. 2, a first block of sections 46 are watermarked with R1D1, R2D2, R3D3, and R4D4; a second block of sections 48 are watermarked with R5D1, R6D2, R7D3 and R8D4; and so on. In this exemplary embodiment, each of the identifier portions (D1, D2 . . . Dm) is mapped into a block using the "mod" operator. However, it is understood that any other method of mapping the D partitions into each block may be utilized. The result is a watermarked digital recording 24 that includes n watermarked sections commingled with the N tracks.

Verification of watermarked digital recording 24 is accomplished by verifying that each of the n watermarks encoded by encoder 14 exist. Verification system 28 achieves this in the following manner. First, watermark extraction system 30 opens an inputted digital recording, determines how many sections n' exist, and reads each of the n' watermarks. The random numbers (R1', R2' . . . Rn') and identifier portions (D1', D2' . . . Dm') are then extracted. Identifier portions (D1', D2" . . . Dm') may be extracted on a block-by-block basis based on an inverse of the mapping formula used to map the portions into blocks by encoder 14.

Next, a first verification identifier D' is calculated by the same hash function 20 that was used by encoder 14. Thus, D'=H(R1', R2' . . . Rn'). Then, a second verification identifier D" is calculated by coalescing function 34, which combines the extracted identifier partitions D1', D2' . . . Dm'. Coalescing function 34 operates in an inverse manner in which portioning function P 22 splits identifier D. Accordingly, D"=$P^{-1}$(D1', D2' . . . Dm'). Next, comparator 36 compares D' and D" to determine if all of the sections, and therefore the entire digital recording, is present. If D' is not equal to D", this indicates (1) that not all sections are present or (2) that some of the sections have been modified, and abort mechanism 40 will abort the processing. If the entire digital recording is present, processing system 38 will proceed with the desired processing (e.g., record/playback/transmit).

The proposed system and method is effective since if one or more section is changed or left out, the verification system's hash calculation D'=H(R1', R2' . . . Rn') will be different from the encoder's hash calculation D=H(R1, R2 . . . Rn), and therefore not match with the extracted and combined identifier D"=$P^{-1}$(D1', D2' . . . Dm'). It is of negligible probability that a collection with missing, altered, or replaced sections will provide the same hash value as the original content.

If the identifier D is split into m parts, these parts reoccur periodically, and the number of possible different watermarks is m·$2^r$, where r is the number of bits in each random number. Accordingly, even if a few sections have the same watermark, the system is still effective as long as most of the watermarks are different. (Otherwise, a subset of sections could falsely prove the presence of the whole CD content.) If there are 300 sections on a given music CD, it is relatively easy to achieve an implementation wherein almost all watermarks are different (e.g., m=5, r=6 will achieve over 300 watermarks).

The length of the watermark r+d/m can be freely chosen, but should be chosen to prevent substitution attacks using sections from other CD's kept in a manageable size pre-calculated table. The following parameters can be freely chosen, but have preferred ranges and values as follows: r= 4 . . . 16; d=32 . . . 80; m=1 . . . 16; m·$2^r \geq$ 300; and r+d/m>16.

It is understood that systems, mechanisms, and modules described herein can be implemented in hardware, software, or a combination of hardware and software. They may be implemented by any type of computer system—or other apparatus adapted for carrying out the methods described herein. A typical combination of hardware and software could be a general-purpose computer system with a computer program that, when loaded and executed, controls the computer system such that it carries out the methods described herein. Alternatively, a specific use computer, containing specialized hardware for carrying out one or more of the functional tasks of the invention could be utilized. The present invention can also be embedded in a computer program product, which comprises all the features enabling the implementation of the methods and functions described herein, and which—when loaded in a computer system—is able to carry out these methods and functions. Computer program, software program, program, program product, or software, in the present context mean any expression, in any language, code or notation, of a set of instructions intended to cause a system having an information processing capability to perform a particular function either directly or after either or both of the following: (a) conversion to another language, code or notation; and/or (b) reproduction in a different material form.

The foregoing description of the preferred embodiments of the invention have been presented for purposes of illustration and description. They are not intended to be exhaustive or to limit the invention to the precise form disclosed, and obviously many modifications and variations are possible in light of the above teachings. Such modifications and variations that are apparent to a person skilled in the art are intended to be included within the scope of this invention as defined by the accompanying claims.

I claim:

1. A system for marking a digital recording, wherein the digital recording includes a plurality of tracks, comprising:
   a mechanism for dividing the digital recording into a plurality of sections and associating a random number with each section;
   a mechanism for calculating an identifier as a function of the associated random numbers; and
   a watermarking mechanism for watermarking sections within a block of sections, wherein the watermark for each section includes the random number associated with the section and a portion of the identifier.

2. The system of claim 1, wherein the digital recording includes a music recording, and the plurality of tracks include individual songs.

3. The system of claim 1, wherein a length of each section is less than a length of each track, and the number of sections is greater than the number of tracks.

4. The system of claim 1, wherein the identifier is a hash.

5. The system of claim 1, wherein the watermarking mechanism splits the identifier among the sections within the block.

6. A program product stored on a recordable media for marking a digital recording having a plurality of tracks that, when executed, comprises:
   means for assigning a value to each of a plurality of sections within the digital recording;

means for calculating an identifier as a function of all of the assigned values; and means for determining a watermark for each section within a block of sections, wherein each watermark includes the value assigned to the section and a portion of the identifier.

7. The program product of claim 6, wherein each value is a random number.

8. The program product of claim 6, wherein the identifier is a hash.

9. The program product of claim 6, wherein the block of sections consists of one section and the portion of the identifier consists of the entire identifier.

10. A method for preventing unauthorized use of a digital recording, wherein the digital recording includes a plurality of tracks, comprising:

encoding the digital recording with the steps of:
  partitioning the digital recording into a plurality of sections;
  generating a random number for each section;
  calculating an identifier as a function of all of the generated random numbers;
  splitting the identifier into m partitions, wherein m is an integer;
  grouping the sections into blocks of m sections; and
  watermarking each section in each block with the random number for the section and one of the m partitions.

11. The method of claim 10, further comprising:
verifying the digital recording with the steps of:
  reading the watermark from each section;
  extracting the random numbers from each section;
  recalculating the identifier as the function of all of the extracted random numbers;
  extracting each of the m partitions from a first block of sections;
  coalescing the m partitions into a second identifier; and
  comparing the recalculated identifier with the second identifier.

12. The method of claim 11, comprising the further step of terminating processing of the digital recording if the recalculated identifier does not match the second identifier.

13. The method of claim 10, wherein the identifier is a hash.

* * * * *